(12) United States Patent
Bhatt (10) Patent No.: US 8,386,352 B1
(45) Date of Patent: Feb. 26, 2013

(54) SYSTEM AND METHOD FOR PROVIDING ACCOUNTING ADJUSTMENT RULES IN TRIAL BALANCES

(75) Inventor: Patanjali Bhatt, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 626 days.

(21) Appl. No.: 12/395,548

(22) Filed: Feb. 27, 2009

(51) Int. Cl.
*G06Q 40/00* (2012.01)
(52) U.S. Cl. ............................................. 705/35; 705/30
(58) Field of Classification Search .............. 705/35–40, 705/30
See application file for complete search history.

(56) References Cited

U.S. PATENT DOCUMENTS

| | | | | |
|---|---|---|---|---|
| 7,117,177 | B2* | 10/2006 | Madden | 705/37 |
| 7,321,869 | B1* | 1/2008 | Phibbs, Jr. | 705/30 |
| 2003/0139985 | A1* | 7/2003 | Hollar et al. | 705/30 |
| 2005/0044015 | A1* | 2/2005 | Bracken et al. | 705/30 |
| 2005/0138558 | A1* | 6/2005 | Duevel et al. | 715/700 |
| 2007/0088636 | A1* | 4/2007 | Nault | 705/30 |
| 2008/0077530 | A1* | 3/2008 | Banas et al. | 705/50 |
| 2009/0048883 | A1* | 2/2009 | Kelly et al. | 705/7 |
| 2009/0070197 | A1* | 3/2009 | Ermolli | 705/10 |
| 2012/0191580 | A1* | 7/2012 | Bhatt | 705/30 |

\* cited by examiner

*Primary Examiner* — James Vezeris
*Assistant Examiner* — Ed Baird
(74) *Attorney, Agent, or Firm* — Osha Liang LLP (57) ABSTRACT

A method for preparing a financial statement for a member of a group of members participating in a community system. The method includes submitting a request to the community system for an accounting adjustment rule. The request includes an attribute of the member, an adjustment rule type, and an account of a general ledger of the member. The accounting adjustment rule is used to adjust a trial balance of the general ledger, obtaining the accounting adjustment rule from the community system based on the request, making an adjustment in the account based on the accounting adjustment rule to obtain an adjusted trial balance, validating the adjusted trial balance of the general ledger subsequent to making the adjustment, and preparing the financial statement for the member upon validating the adjusted trial balance. The accounting adjustment rule is contributed to the community system by at least one of the group of members.

18 Claims, 4 Drawing Sheets

SYSTEM AND METHOD FOR PROVIDING ACCOUNTING ADJUSTMENT RULES IN TRIAL BALANCES

BACKGROUND

In accounting, the trial balance is a worksheet listing the balance on a certain date, of each ledger account in two columns, namely debit and credit. Under the double-entry system, for each transaction the total of any debits must equal the total of any credits. Accordingly, in a trial balance, the total of the debit side should always be equal to the total of the credit side. The trial balance thus serves as a tool to detect errors, which can result when the debit and credit totals are not equal.

Generally Accepted Accounting Principles (GAAP) is the standard framework of guidelines for financial accounting. It includes the standards, conventions, and rules accountants follow in recording and summarizing transactions, and in the preparation of financial statements. Generally speaking, GAAP is based on principles, such as Principle of Regularity, Principle of Sincerity, Principle of the Permanence of Methods, Principle of Non-Compensation, Principle of Prudence, Principle of Continuity, Principle of Periodicity, etc.

Adjusting trial balances to comply with GAAP or other accounting principles is a time-consuming, error prone, research intensive, and industry specific process. The complexity arises in the existence of a very large number of accounts within a company's General Ledger and the wide variety of rules that may be applied to each account in order to make adjustments that comply with GAAP and other accounting principles. Further, rules may change based on new regulations and/or may be subject to interpretation depending on the industry. If an accountant is not familiar with the industry or the nature of the account to which an adjustment is being made, the accountant may need to conduct extensive research in order to determine, substantiate, and record the adjustments correctly.

SUMMARY

In general, in one aspect, the invention relates to a method for preparing a financial statement for a member of a plurality of members participating in a community system. The method includes submitting a request to the community system for an accounting adjustment rule, wherein the request comprises an attribute of the member, an adjustment rule type, and an account of a general ledger of the member, and wherein the accounting adjustment rule is used to adjust a trial balance of the general ledger, obtaining the accounting adjustment rule from the community system based on the request, making an adjustment in the account based on the accounting adjustment rule to obtain an adjusted trial balance, validating the adjusted trial balance of the general ledger subsequent to making the adjustment, and preparing the financial statement for the member upon validating the adjusted trial balance, wherein the accounting adjustment rule is contributed to the community system by at least one of the plurality of members.

In general, in one aspect, the invention relates to a method for providing an accounting adjustment rule to a member of a plurality of members participating in a community system. The method includes receiving a request for the accounting adjustment rule from the member, wherein the request comprises an attribute of the member, an adjustment rule type, and an account of a general ledger of the member, and wherein the accounting adjustment rule is used to adjust a trial balance of the general ledger, identifying the accounting adjustment rule from a plurality of accounting adjustment rules in the community system based on the request, and providing the accounting adjustment rule to the member responsive to the request, wherein the account is adjusted based on the accounting adjustment rule and subsequently an adjusted trial balance of the general ledger is validated.

In general, in one aspect, the invention relates to a computer system for sharing an accounting adjustment rule among a plurality of members of a community. The computer system includes a repository configured to store a plurality of accounting adjustment rules contributed from at least one of the plurality of members, a processor and memory operatively coupled to the repository, the memory storing instructions when executed by the processor comprise functionality for receiving a request for the accounting adjustment rule from the member, wherein the request comprises an attribute of the member, an adjustment rule type, and an account of a general ledger of the member, and wherein the accounting adjustment rule is used to adjust a trial balance of the general ledger, identifying the accounting adjustment rule from a plurality of accounting adjustment rules in the community system based on the request, and providing the accounting adjustment rule to the member responsive to the request, wherein the account is adjusted based on the accounting adjustment rule and subsequently an adjusted trial balance of the general ledger is validated.

In general, in one aspect, the invention relates to a computer readable medium, embodying instructions executable by the computer to share an accounting adjustment rule among a plurality of members of a community. The instructions includes functionality for submitting a request to the community system for an accounting adjustment rule, wherein the request comprises an attribute of the member, an adjustment rule type, and an account of a general ledger of the member, and wherein the accounting adjustment rule is used to adjust a trial balance of the general ledger, obtaining the accounting adjustment rule from the community system based on the request, performing an adjustment in the account based on the accounting adjustment rule to obtain an adjusted trial balance of the general ledger, validating the adjusted trial balance subsequent to performing the adjustment, and preparing the financial statement for the member upon validating the adjusted trial balance, wherein the accounting adjustment rule is contributed to the community system by at least one of the plurality of members.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention.

However, it will be apparent to one of ordinary skill in the art that the invention may be practiced without these specific details. In other instances, well-known features have not been described in detail to avoid unnecessarily complicating the description.

In general, embodiments of the invention provide a system and method to share (e.g., contribute, retrieve, etc.) accounting adjustment rules among members of a community system in an effort to prepare a financial statement for a member participating in the community system. In one or more embodiments of the invention, the accounting adjustment rules may be categorized according to member attributes and adjustment types. Generally speaking, member attributes may include industry, business category, applicable accounting principal, geographic location, etc. In one or more embodiments of the invention, the accounting adjustment rules may be rated by community members and may each be associated with a user rating shared within the community.

Figure 1:
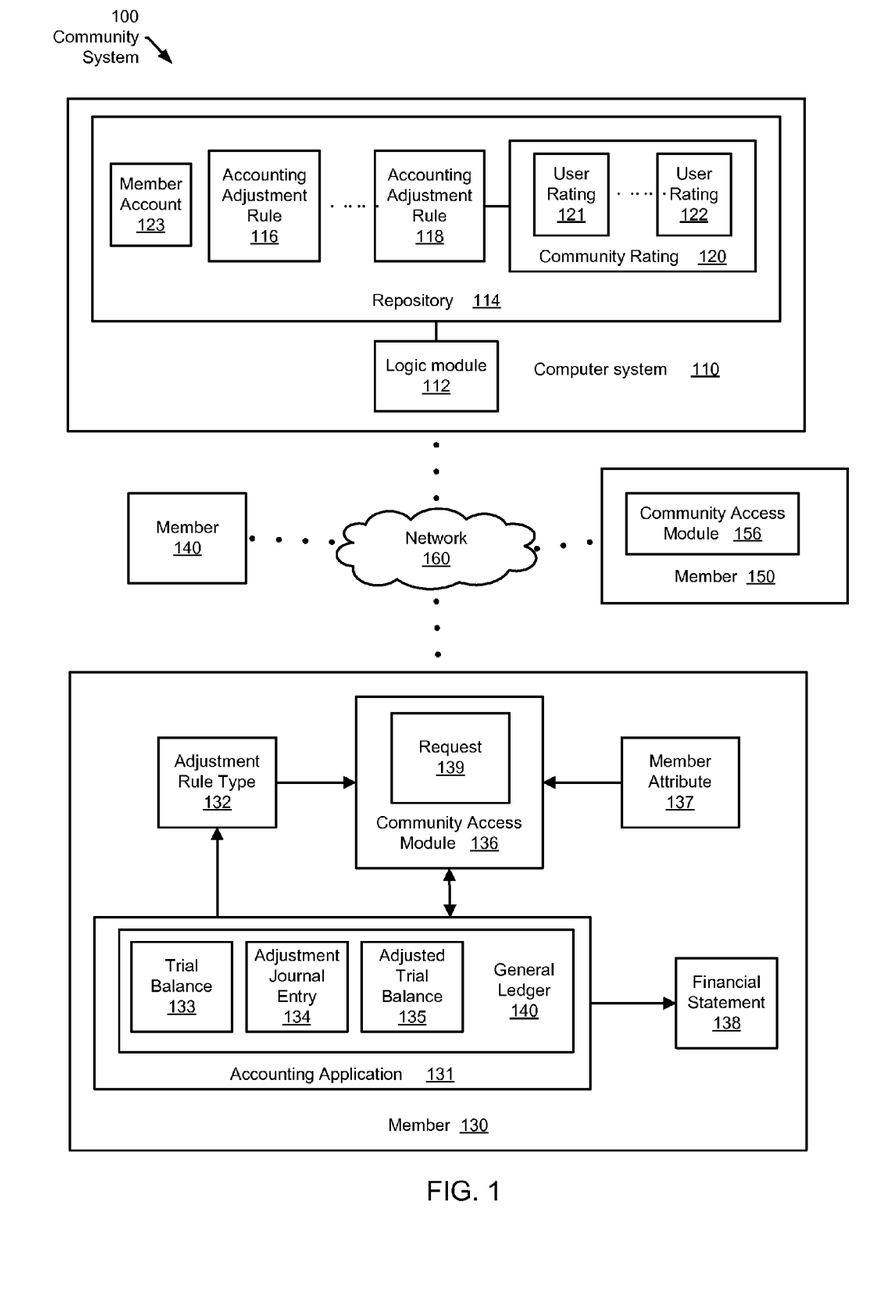
FIG. 1 depicts a schematic block diagram of a system in accordance with one or more embodiments of the invention.

FIG. 1 depicts a schematic block diagram of a community system (100) in accordance with one or more embodiments of the invention. In one or more embodiments of the invention, one or more of the modules shown in FIG. 1 may be omitted, repeated, and/or substituted. Accordingly, embodiments of the invention should not be considered limited to the specific arrangements of modules shown in FIG. 1.

As shown in FIG. 1, the community system (100) includes a computer system (110) and multiple members (e.g., 130, 140, 150, etc.) coupled via network (160). In one or more embodiments of the invention, the community system (100) and its various components may be hosted on one or more servers (not shown). Further, in one or more embodiments of the invention, more than one computer system (110), more than one network (160), and/or more than three members may also be included in the community system (100).

Further as shown in FIG. 1, the computer system (110) includes a logic module (112) and repository (114). The repository (114) is configured to store member accounts (e.g., 123), accounting adjustment rules (e.g., 116, 118), and user ratings (e.g., 121, 122), which collectively are referred to as a community rating (120). In one or more embodiments of the invention, a logic module (112) may be implemented as hardware, software, or a combination thereof. As software, the logic module (112) may be implemented using a variety of structure and unstructured programming languages, including Java® (Java is a registered trademark of Sun Microsystems, Inc., Santa Clara, Calif.), C, C++, C#, machine assembly, and/or other programming languages.

One skilled in the art will appreciate that a repository (114) may be implemented using various different formats of storage devices (e.g., mechanical hard disk, flash memory, and/or other storage media) and that accounting adjustment rules (116, 118) and the community rating (120) may be stored in various data structures (e.g., files, arrays, databases, relational databases, or any other suitable data structure).

In one or more embodiments of the invention, community members (e.g., 130-150) may access the computer system (110) through a network (160) (e.g., local area network (LAN), wide area network (WAN), metropolitan area network (MAN), Internet, Intranet, wired network, wireless network, and/or other networking infrastructures) for accessing (e.g., providing, storing, retrieving, etc.) information (e.g., accounting adjustment rules (116, 118) and the community rating (120)). In one or more embodiments, the accounting adjustment rule (118) may be contributed by one community member (e.g., 150) to the computer system (110) while another community member (e.g., 130) may access computer system (110) for an applicable accounting adjustment rule.

Continuing with the discussion of FIG. 1, each community member (130-150) may be a business entity such as a small business, a corporation, or any other type of business entity characterized by a member attribute (e.g., 137 for member 130). The member attribute (137) may include an industry, a business category, an applicable accounting principal, a geographic location, or any other attribute of the community member (130). For example, the community member (130) may be in the financial services industry, operating a banking business, using GAAP as accounting principal, and located in the state of California. As shown in FIG. 1, each community member (130) has an accounting application (131), adjustment rule type (132), a community access module (136), a member attribute (137), and a financial statement (138). Community members (140-150) (with details omitted for clarity) have essentially the same components as community member (130). One skilled in that art will appreciate that accounting applications used by different members may differ in configuration or provided by different software providers.

The accounting application (131) may be any business accounting software configured with functionality to manage (e.g., create, revise, post, etc.) a general ledger (140) and generate financial statements (e.g., 138). Periodically, a trial balance (133) of the general ledger (140) may be generated prior to preparing the financial statement (138). By reviewing trial balance (133), a need to make an adjustment to the general ledger (140) may be identified (e.g., by a user such as an accountant of member (130)) with an adjustment rule type (132). The adjustment rule type (132) is related to an accounting adjustment rule to be applied to an account (e.g., depreciation, uncollectible debt, etc.) in the general ledger (140).

In one or more embodiments of the invention, the adjustment rule type (132) may be identified based on a set of initial rules contemplated by the accountant to compute the adjustment amount. The adjustment rule type (132) may include, but not limited to, the following methods on which the accounting adjustment rules are based: expected values, lookup table, mandated limits, polynomial computations, regression-based computations, other mathematical computations, etc. Additional adjustment rule types may be based on combined use of one or more of these methods to generate compound methods. For example, in order to compute an adjustment for uncollectible debt, the user (e.g., an accountant) may base the computation on one or the following:

(i) looking up from a table of uncollectible debt for a given industry, (ii) estimating using a weighted formula such as 90% for debt<30 days of age, 50% for debt>30 days of age but less than 60 days, 10% for debt>180 days of age, etc., and (iii) a fixed percent corresponding to a number published by a trade association or a regulatory body such as the IRS, etc.

Furthermore, two or more of the above may be combined in a decision tree to determine which one is most appropriate.

In one or more embodiments of the invention, the community access module (136) may be configured to generate a request (139) for an applicable accounting adjustment rule based on the adjustment rule type (132), a general ledger account (not shown) to be adjusted, and a member attribute (137). The community access module (136) may be further configured to submit the request (139) to the computer system (110) and receive an accounting adjustment rule (e.g., 116, 118) from the computer system (110) via a network (160). In one embodiment, the member attribute (137) may be submitted as part of the request (139). In one embodiment, information of a member attribute (137) may be stored in a member account (123) of a member (130) such that the request (139) may not explicitly include the member attribute (137). For example, the member account (123) may include attribute information of the member (130), such as (i) industry: financial services; (ii) business: banking; (iii) accounting principal: GAAP; and (iv) location: the state of California.

As another example described above, accounting adjustment rule (118) may be contributed by another community member (150) to computer system (110). In one or more embodiments of the invention, the community access module (156) may be configured to submit an accounting adjustment rule (118) to the computer system (110) as a contribution by the contributing community member (150) to the community system (100). In one embodiment, the adjustment rule (118) may be submitted with a corresponding adjustment rule type (not shown), applicable general ledger accounts (not shown) relating to the adjustment rule type, and member attribute (not shown) of the member (150). In one embodiment, information of member attribute may be stored in member account (not shown) of the contributing community member (150) such that member attribute may not be explicitly included in the submission.

In one or more embodiments of the invention, the logic module (112) is configured to manage information stored in the repository (114) and to interact with community members (e.g., 130-150) via their respective community access modules (e.g., (136)).

In one embodiment, the logic module (112) may be configured to manage accounting adjustment rules (e.g., 116, 118) contributed from the community members (e.g., 130-150). For example, the logic module (112) may be configured to store the contributed accounting adjustment rule (118) in a searchable data structure (e.g., files, arrays, databases, relational databases, etc.) of the repository (114) indexed by the contributing member attribute as well as adjustment rule type and applicable general ledger accounts associated with the contributed accounting adjustment rule (118).

In one embodiment, the collection of community shared accounting adjustment rules may be rated by community members that have retrieved and used them. For example, the user ratings may be compiled (e.g., stored directly or analyzed/summarized before stored) in the community system as a community rating. In one embodiment, the requested accounting adjustment rule may be selected from the candidate rules based on the community rating. For example, the requested accounting adjustment rule may be selected automatically by the community system business logic by comparing the community rating to a pre-determined threshold. In another example, the candidate rules and respective community ratings may be presented to the user for selection.

In one embodiment, the logic module (112) is further configured to receive, from various community members, user ratings (e.g., 121, 122) with respect to accounting adjustment rules (e.g., 116, 118) and determine a community rating (120) based on a pre-determined algorithm (e.g., a weighted average scheme). For example, the user ratings (121, 122) may be provided by a member (130) with respect to the accounting adjustment rules (116, 118), individually. In another example, user ratings (121, 122) may be provided by different members with respect to the same accounting adjustment rule while the community rating (120) may be an average of the user ratings (121, 122). Throughout this document, the term "community rating" may refer to a collection of user ratings provided from one or more members, a summary rating (e.g., an average) derived from user ratings of different members with respect to one accounting adjustment rule, or combinations thereof.

In one or more embodiments of the invention, the logic module (112) is further configured to identify applicable accounting adjustment rules (e.g., (116, 118) responsive to receiving a request (e.g., 139) from a community member (e.g., 130) by searching the searchable data structure of the repository (114) according to the member attribute, adjustment rule type, and general ledger account associated with the request (139). In one embodiment, the logic module (112) is configured to provide identified applicable accounting adjustment rules (e.g., 116, 118) with respective user ratings (e.g., 121, 122) to the requesting member (130).

In one or more embodiments of the invention, the community access module (136) may be configured to select, based on the community rating (120), one accounting adjustment rule from several applicable accounting adjustment rules (e.g., 116, 118) obtained from computer system (110). For example, the selection may be made automatically based on pre-determined criteria that matches the industry, the business, the applicable accounting principal, and the geographical location in a pre-determined order using a pre-determined match scoring formula. For example, the pre-determined criteria and/or match scoring formula may be based on a statistical measure (e.g., popularity measure) derived from the community rating or other heuristics such as—"Find a match within my NAICS code and zip code first, if no match, find closest zip code with same NAICS code, if none yet, outer NAICS code and current zip code, etc." Alternatively, the selection may be made by presenting several applicable accounting adjustment rules associated with respective user ratings to the user (e.g., an accountant of member (130)) for decision.

Based on the selected accounting adjustment rule, an adjustment journal entry (134) may be made by the user in the general ledger (140) using accounting application (131). Subsequently, an adjusted trial balance (135) may be generated and evaluated by the user. In one or more embodiments of the invention, the community access module (137) may be configured to allow the user (e.g., an accountant of member (130)) to determine, according to the evaluation result, a user rating of the selected accounting adjustment rule and to submit the user rating to the computer system (110). In one embodiment of the invention, the user rating represents an opinion (e.g., applicability, quality, reliability, etc.) of a member (130) regarding the use of the selected accounting adjustment rule to address the need for adjusting a trial balance (133). One skilled in the art will appreciate that the user rating may be based on a pre-determined rating scale (e.g., a numbered scale from 1 to 10, a percentage scale from 0 percent to 100 percent, a rating scale of un-satisfactory, semi-satisfactory, and satisfactory, any other appropriate scale for indicating the rating, or any combination thereof).

In one or more embodiments of the invention, the community system (100) may be based on various different membership policies, such as open membership, invitation only membership, free membership, paid membership, flat membership, tiered membership, and other variations of membership policies. The access (e.g., to provide, store, retrieve, etc.) privileges may be available to members in the community system (100) according to an established membership policy. The access privileges may be administered in the computer system (110) by the logic module (112). Additional administration and management functions of the computer system (110) may also be implemented by the logic module (112). For example, a member (e.g., 130) may be required to set up a member account (e.g., 123) that includes information of member attribute (e.g., 137). In one embodiment, a member (e.g., 140) may access the computer system (110) as a guest and include member attribute information in the submitted request without setting up a member account.

In one or more embodiments of the invention, the computer system (110) may be administered, managed, or otherwise operated by a community management entity (not shown). For example, classification categories of member attributes, adjustment rule types, and/or an associated applicable general ledger account may be managed (e.g., defined, revised, released, or otherwise provided to community members) by the community management entity. In one embodiment, the community access module (136) may be provided by the community management entity to one or more members of the community system (100). In one embodiment, the community access module (136) may be an add-on module or a plug-in module of the accounting application (131). In one embodiment, the community access module (136) may be a stand-alone application separate from the accounting application (131). In one embodiment, the community access module (136) may be integrated in the accounting application (131) and provided by the provider of the accounting application (131) based on a standard released from the community management entity.

Figure 2:
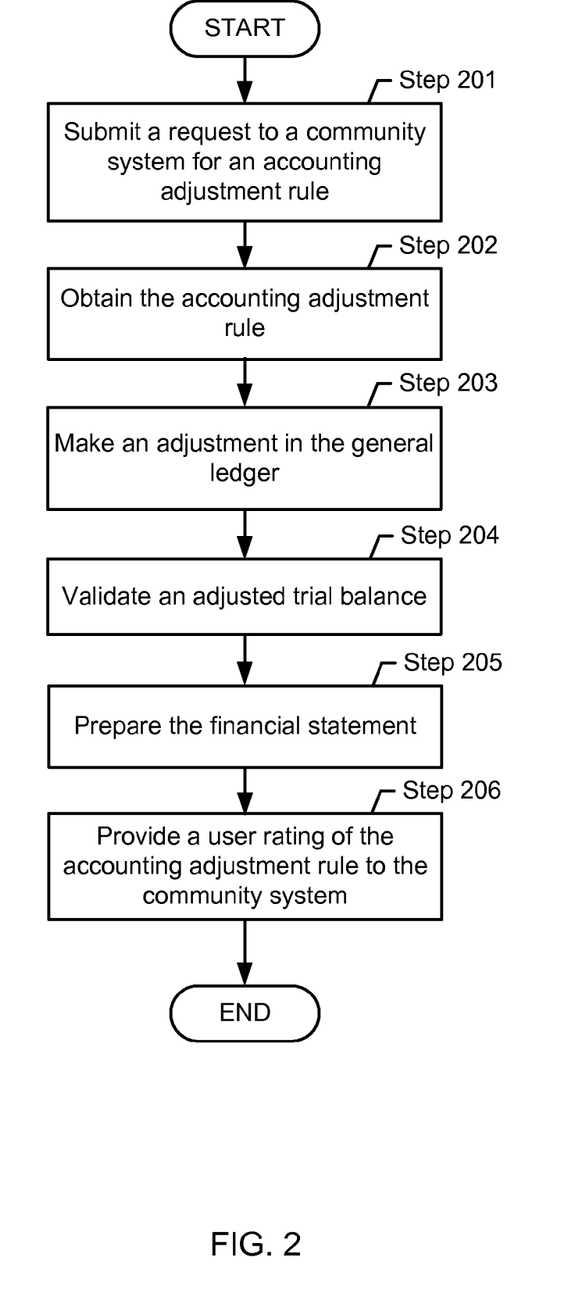
FIG. 2 and FIG. 3 depict flowcharts of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. The method as shown in FIG. 2 may be practiced using community system (100) and/or the computer system (110) described with respect to FIG. 1 above.

In Step 201, a request may be submitted by a business entity to a community system for an accounting adjustment rule. For example, the business entity may be a member of a community participating in the community system while the requested accounting adjustment rule may be for adjusting a trial balance of the business entity's general ledger. In one embodiment, the request may include a member attribute, a rule adjustment type, and a general ledger account for adjusting the trial balance. In one embodiment, the requesting community member may log into a member account of the community system for submitting the request. In such an embodiment, the member attribute may not be explicitly included in the request.

In Step 202, the requested accounting adjustment rule may be obtained from the community system based on the request. In one embodiment, the adjustment rule may be identified, based on a pre-determined criterion, by business logic of the community system from the collection of community shared accounting adjustment rules using the adjustment rule type, the general ledger account, and the member attribute included in the request. One skilled in the art will appreciated that various techniques may be used to identify the accounting adjustment rule.

In Step 203, an adjustment is made in the general ledger according to the accounting adjustment rule obtained from the community system to generate an adjusted trial balance. In Step 204, the adjusted trial balance of the general ledger is validated. Once the user is satisfied with the adjusted trial balance, a financial statement may then be prepared (Step 205). In Step 206, a user rating of the accounting adjustment rule may be obtained and provided to the community system by the user reflecting the user's opinion regarding the applicability, quality, reliability, etc. of the accounting adjustment rule based on validating the adjusted trial balance.

Figure 3:
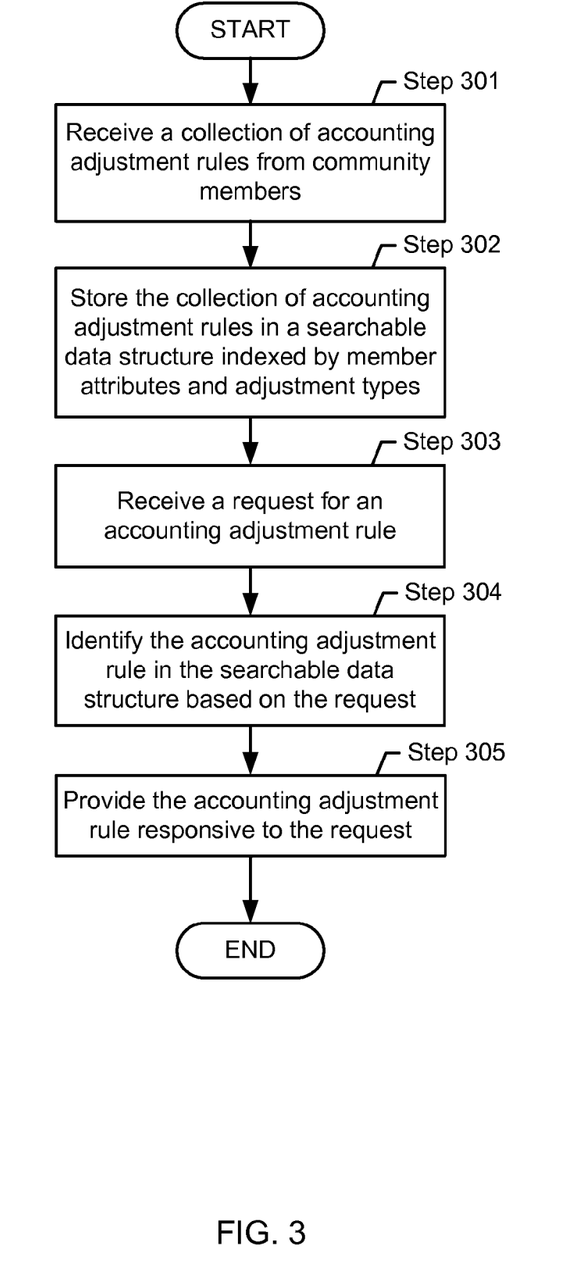

FIG. 3 depicts a flowchart of a method in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangements of steps shown in FIG. 3. The method as shown in FIG. 3 may be practiced using community system (100) and/or the computer system (110) described with respect to FIG. 1 above.

In Step 301, a collection of accounting adjustment rules may be received by a community system from community members. For example, each contributed accounting adjustment rule may be from a contributing member based on satisfactory result obtained for adjusting a trial balance of the contributing member's general ledger using the contributed accounting adjustment rule. In one embodiment, the contributed accounting adjustment rule may be received along with an attribute of the contributing member (i.e., member attribute), an adjustment rule type, and a general ledger account for adjusting the trial balance. In one embodiment, classification categories of the member attributes and formats of the adjustment rule type may be managed by an operator of the community system.

In Step 302, the collection of community shared accounting adjustment rules may be stored in a searchable data structure indexed by member attributes of contributing members, adjustment rule types, and applicable general ledger accounts indicated by the contributors regarding applicability of the accounting adjustment rules.

In Step 303, the community system receives a request for accounting adjustment rule from a community member. In one embodiment, the request may include attributes of the requesting member and an adjustment type indicating the type of accounting adjustment rule requested. In one embodiment, the requesting community member may log into a member account of the community system for submitting the request. In such embodiments, the member attribute may not be explicitly included in the request; rather the member attribute may be derived from the member account.

In Step 304, an accounting adjustment rule is identified in the searchable data structure, for example by business logic of the community system based on a pre-determined criterion. In one embodiment, the accounting adjustment rule may be identified using the adjustment type and the member attribute included in the request. In Step 305, the accounting adjustment rule is provided to the requesting community member responsive to the request.

The following is an example of using community shared accounting adjustment rules for adjusting a trial balance. This exemplary application may be practiced using the community system (100) and/or the computer system (110) of FIG. 1 and based on the method described with respect to FIG. 2 and FIG. 3 above. The example is not intended to limit the scope of the invention.

An accountant has received a construction company's general ledger and needs to prepare a financial statement for audit purposes. The company has hundreds of outstanding items on the general ledger account "Accounts Receivable" with varying amounts, which constitute significant portions of the company's assets as well as future cash flow. An accurate estimation of the receivables that are unlikely to be collected is very important for estimating the business's health and need to be reflected in the financial statement.

The accountant has identified one initial accounting adjustment rule with a particular adjustment rule type to compute the adjustment, which uses expected values from a simple formula:

>180 discount 100%;
90-180 days—discount 50%;
less than 90 days, do not discount.

Upon applying this formula and reviewing a trial balance of the general ledger, the accountant realizes that resultant cash flow appear to be too high compared to similar businesses in the area. Sensing that the adjustment based on the initial accounting adjustment rule may likely overstate cash flow in the financial statement as indicated by the trial balance, the accountant looks for additional computation methods (i.e., accounting adjustment rules) within the community system using various criteria (relating to adjustment rule type, attributes of the company, rating from other community members, etc.), such as local geography, NAICS codes for the construction industry, etc. The accountant finds 30 different adjustment rules. The accountant then creates another target group of 3 rules based on closest matches to the criteria. One is a lookup, one uses regression, and one uses a published number. The accountant finds that the three rules show high variability in the adjusted trial balance results when applied to the general ledger account "Accounts Receivable". The accountant, therefore, creates a combined rule using regression and the expected value formula, which results in an adjusted trial balance that is acceptable and comparable to the company's industry peers. The accountant now gives this new rule a name and contributes it back to the community system with notes and descriptions. The accountant uses this accounting adjustment rule for future engagements with this particular client company. In the example above, the participation in the community system may be based on community membership of the accountant or the company.

Figure 4:
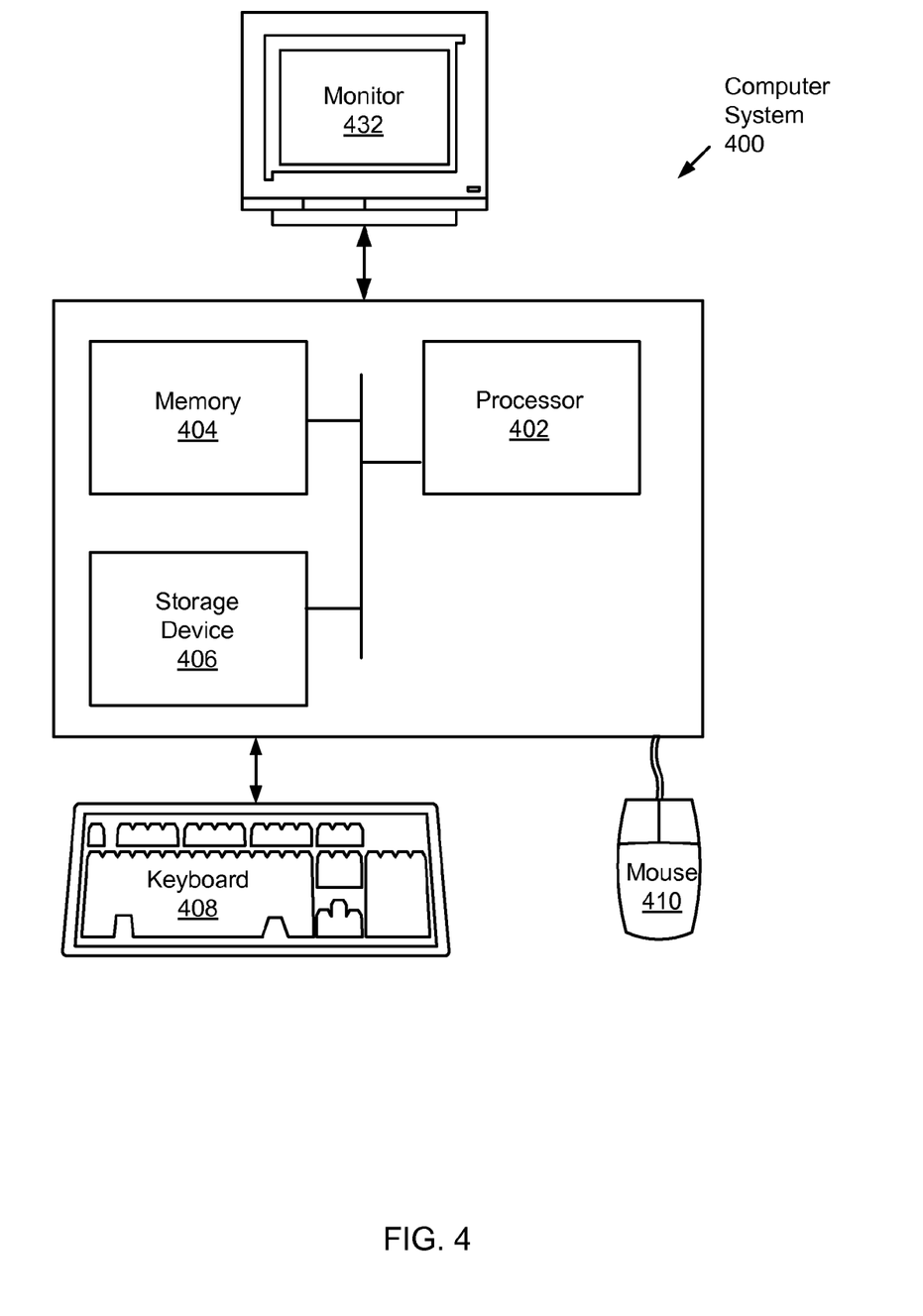
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (432) (e.g., a liquid crystal display (LCD), a plasma display, or cathode ray tube (CRT) monitor). The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for preparing a financial statement for an accounting professional of a plurality of accounting professionals participating in a community system comprising a repository storing a plurality of accounting adjustment rules, the method comprising:
 receiving, by a processor and from the accounting professional, a request for an accounting adjustment rule for a general ledger, wherein the request comprises an industry of the accounting professional, an adjustment rule type, and an account of the general ledger of the accounting professional;
 accessing, by the processor and in response to the request, the repository of the community system storing the plurality of accounting adjustment rules, wherein the plurality of accounting adjustment rules were contributed by the plurality of accounting professionals;
 retrieving, by the processor and in response to the request, the accounting adjustment rule specified in the request from the repository of the community system, wherein the accounting adjustment rule relates to the industry specified in the request and comprises a community rating;
 performing, using the accounting adjustment rule for the general ledger, an adjustment in the account generating an adjusted trial balance of the general ledger;
 verifying, by the processor and subsequent to performing the adjustment that a plurality of credits equals a plurality of debits in the adjusted trial balance; and
 preparing, by the processor and after verifying, the financial statement for the accounting professional.

2. The method of claim 1, wherein the request further comprises an attribute of the accounting professional.

3. The method of claim 2, wherein the attribute of the accounting professional comprises at least one selected from a group consisting of an accounting principal applicable to the accounting professional, a business category of the accounting professional, and a geographical location of the accounting professional.

4. The method of claim 2,
 wherein the community rating is based on user ratings provided by at least one of the plurality of accounting professionals.

5. The method of claim 1, further comprising:
 receiving, from the accounting professional, a user rating of the accounting adjustment rule based on a result of validating verifying the adjusted trial balance; and
 providing the user rating to the community system.

6. The method of claim 1, further comprising:
 indexing the plurality of adjustment rules by adjustment rule types, member attributes of the portion of the plurality of accounting professionals, and applicable general ledger accounts indicated by the portion of the plurality of accounting professionals.

7. The method of claim 1, further comprising:
 providing, to the accounting professional, the community rating of the accounting adjustment rule.

8. A computer system for preparing a financial statement for an accounting professional of a plurality of accounting professionals participating in a community system, comprising:
- a repository configured to store a plurality of accounting adjustment rules contributed by the plurality of accounting professionals;
- a processor and memory operatively coupled to the repository, the memory storing instructions that, when executed by the processor, comprise functionality for:
- receiving, from an accounting professional, a request for an accounting adjustment rule for a general ledger, wherein the request comprises an industry of the accounting professional, an adjustment rule type, and an account of the general ledger of the accounting professional;
- accessing, in response to the request, the repository of the community system storing the plurality of accounting rules, wherein the plurality of accounting adjustment rules were contributed by the plurality of accounting professionals;
- retrieving, in response to the request, the accounting adjustment rule specified in the request from the repository of the community system, wherein the accounting adjustment rule relates to the industry specified in the request and comprises a community rating;
- performing, using the accounting adjustment rule for the general ledger, an adjustment in the account generating an adjusted trial balance of the general ledger;
- verifying, subsequent to performing the adjustment, that a plurality of credits equals a plurality of debits in the adjusted trial balance; and
- preparing, after verifying, the financial statement for the accounting professional.

9. The computer system of claim 8, the instructions when executed by the processor further comprising functionality for:
- receiving, from the accounting professional, a user rating of the accounting adjustment rule based on a result of verifying the adjusted trial balance; and
- providing the user rating to the community system.

10. The computer system of claim 8, the instructions when executed by the processor further comprising functionality for:
- providing, to the accounting professional, the community rating of the accounting adjustment rule, wherein the community rating is based on a user rating received from at least one of the plurality of accounting professionals.

11. The computer system of claim 8, wherein the financial statement is prepared using an accounting application of the accounting professional, wherein the request is received from the accounting professional via the accounting application.

12. The computer system of claim 8, wherein the financial statement is prepared using an accounting application of the accounting professional, wherein the request is received from the accounting professional via a community access module separate from and in communication with the accounting application, and wherein the accounting adjustment rule is provided to the accounting professional via the community access module.

13. The computer system of claim 12, wherein the community access module is provided to the accounting professional by a third party separate from the community system.

14. A non-transitory computer readable storage medium, embodying instructions executable by a computer for preparing a financial statement for an accounting professional of a plurality of accounting professionals participating in a community system comprising a repository storing a plurality of accounting adjustment rules, the instructions performing the steps of:
- receiving, from the accounting professional, a request for an accounting adjustment rule for a general ledger, wherein the request comprises an industry of an accounting professional, an adjustment rule type, and an account of the general ledger of the accounting professional;
- accessing, in response to the request, the repository of the community system storing the plurality of accounting adjustment rules, wherein the plurality of accounting adjustment rules were contributed by the plurality of accounting professionals;
- retrieving, in response to the request, the accounting adjustment rule specified in the request from the repository of the community system, wherein the accounting adjustment rule relates to the industry specified in the request and comprises a community rating;
- performing, using the accounting adjustment rule for the general ledger, an adjustment in the account generating an adjusted trial balance of the general ledger;
- verifying, subsequent to performing the adjustment, that a plurality of credits equals a plurality of debits in the adjusted trial balance; and
- preparing, after verifying, the financial statement for the accounting professional.

15. The non-transitory computer readable storage medium of claim 14, wherein the request further comprises an attribute of the accounting professional.

16. The non-transitory computer readable storage medium of claim 15, wherein the attribute of the accounting professional comprises at least one selected from a group consisting of an accounting principal applicable to the accounting professional, a business category of the accounting professional, and a geographical location of the accounting professional.

17. The non-transitory computer readable storage medium of claim 15,
- wherein the community rating is based on user ratings provided by at least one of the plurality of accounting professionals.

18. The non-transitory computer readable storage medium of claim 14, the instructions when executed by the processor further perform the steps of:
- receiving, from the accounting professional, a user rating of the accounting adjustment rule based on a result of validating verifying the adjusted trial balance; and
- providing the user rating to the community system.

* * * * *